J. A. REED.
Nut-Locks.

No. 140,644.

Patented July 8, 1873.

Witnesses,
Chas. H. Smith
Geo. D. Walker

Inventor
John A. Reed
Lemuel W. Serrell
atty.

AM. PHOTO-LITHOGRAPHIC CO. N.Y. (OSBORNE'S PROCESS.)

UNITED STATES PATENT OFFICE.

JOHN A. REED, OF DUNELLEN, NEW JERSEY.

IMPROVEMENT IN NUT-LOCKS.

Specification forming part of Letters Patent No. 140,644, dated July 8, 1873; application filed February 8, 1873.

*To all whom it may concern:*

Be it known that I, JOHN A. REED, of Dunellen, in the county of Middlesex and State of New Jersey, have invented an Improvement in Lock-Nuts, of which the following is a specification:

Lock-nuts have been made in which a wedge is inserted into a cavity in the washer to prevent the nut unscrewing, but such wedge cannot be introduced until the nut has been turned clear of the cavity, and the nut has to be turned back considerably to override the wedge, and in so doing the parts become loose, which is detrimental, especially with the fish-plates of railway bars.

My invention consists in a washer and blocking-piece, in which the blocking-piece is of a shape somewhat resembling a foot that is cut out of the metal of the washer and then introduced into the same hole in the washer, but in a different position after the nut has been screwed up to place, thereby presenting a rigid stop that prevents the nut turning back, and the foot-shaped block having a curved under surface is easily passed into the opening behind the nut, and it cannot work loose or fall out, because it passes up behind the nut and it is held by the nut itself. When the nut is slightly turned back upon the foot it binds the same firmly in place.

Figure 1:
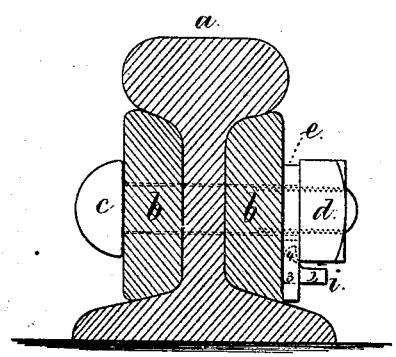
Figure 2:
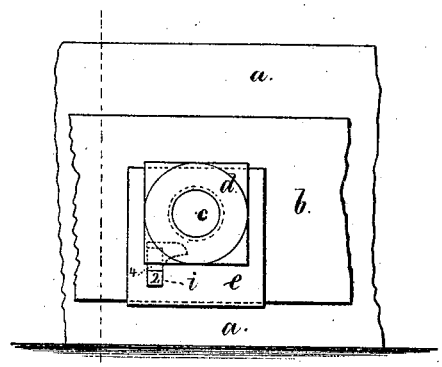
Figure 3:
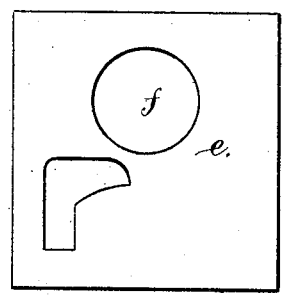
Figure 4:
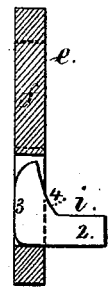

In the drawing, Figure 1 is a section of a railway bar, fish-plate, and lock-nut. Fig. 2 is an elevation of the same. Fig. 3 is a detached view of the washer; and Fig. 4 is a section of the washer and block in its place.

The railroad bar *a*, fish-plates *b*, bolt *c*, and nut *d* are to be of any desired size or character, and the washer *e* is to be of a size adapted to the other parts. The hole *f* in this washer *e* passes the bolt *c* freely, but the washer itself cannot turn upon the bolt in consequence of its lower edge resting against the flange of the rail, or of said washer extending to two or more bolts, or otherwise. The blocking-piece *i* is of a shape somewhat resembling a foot, the portion 2 thereof is square, the base 3 slightly rounding with curved ends, and the top 4 curved or inclined. This being cut out of the metal of the washer allows for producing the blocking-piece free of cost for material. The opening formed in the washer, where the portion 2 is cut out, being of width corresponding to the thickness of the blocking-piece, allows for said blocking-piece being introduced in the positions shown in Figs. 1, 2, and 4, with the base 3 against the fish-bar, the block 2 projecting beyond the surface of the washer, and with the foot portion behind or beneath the nut. The slightly-curved foot is easily introduced after the nut has been screwed up, and the foot passing up behind the nut prevents the blocking-piece falling out, and by a slight backward turn the angle of the nut rides up the curve or incline 4, holding the blocking-piece immovably within the opening in the washer, and simultaneously tightening the nut itself.

If the concussion or strain loosens the parts the blocking-piece cannot fall out, neither can the nut turn back, and when the nut is screwed up the blocking-piece can be taken out and re-inserted behind one of the other angles of the nut.

I claim as my invention—

1. The foot-shaped blocking-piece with a curved base, 3, introduced within and opening in the washer and passed up behind one of the angles of the nut to prevent the same unscrewing, as set forth.

2. The blocking-piece cut out of the metal of the washer, so as to be introduced into the opening in a different position and lock the nut, substantially as set forth.

Signed by me this 6th day of February, A. D. 1873.

JOHN A. REED.

Witnesses:
GEO. T. PINCKNEY,
CHAS. H. SMITH.